(12) United States Patent
Faitelson et al.

(10) Patent No.: US 11,138,153 B2
(45) Date of Patent: \*Oct. 5, 2021

(54) DATA TAGGING

(71) Applicant: VARONIS SYSTEMS, INC., New York, NY (US)

(72) Inventors: Yakov Faitelson, Elkana (IL); Ohad Korkus, Herziliya (IL); Ophir Kretzer-Katzir, Reut (IL); David Bass, Carmei Yoseph (IL)

(73) Assignee: VARONIS SYSTEMS, INC., New York, NY (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/384,111

(22) Filed: Apr. 15, 2019

(65) Prior Publication Data
US 2019/0310967 A1    Oct. 10, 2019

Related U.S. Application Data (63) Continuation of application No. 13/384,465, filed as application No. PCT/IL2011/000409 on May 26, 2011, now Pat. No. 10,296,596.

(60) Provisional application No. 61/348,829, filed on May 27, 2010.

(51) Int. Cl.
| *G06F 16/16* | (2019.01) |
| *G06F 16/907* | (2019.01) |
| *G06F 16/9535* | (2019.01) |
| *G06F 16/36* | (2019.01) |
| *G06F 16/2457* | (2019.01) |
| *G06F 16/93* | (2019.01) |

(52) U.S. Cl.
CPC .......... *G06F 16/164* (2019.01); *G06F 16/907* (2019.01); *G06F 16/2457* (2019.01); *G06F 16/36* (2019.01); *G06F 16/93* (2019.01); *G06F 16/9535* (2019.01)

(58) Field of Classification Search
CPC .... G06F 21/6218; G06F 21/604; G06F 16/93; G06F 16/36; G06F 16/9535; G06F 16/13; G06F 16/122; G06F 16/168; G06F 16/176; G06F 16/48
USPC ................ 707/783, 781, 737, 784, 785, 776
See application file for complete search history.

(56) References Cited

U.S. PATENT DOCUMENTS

| 5,465,387 A | 11/1995 | Mukherjee |
| 5,761,669 A | 6/1998 | Montague et al. |
| 5,889,952 A | 3/1999 | Hunnicutt et al. |

(Continued)

FOREIGN PATENT DOCUMENTS

| CN | 1588889 | 3/2005 |
| CN | 101226537 | 7/2008 |

(Continued)

OTHER PUBLICATIONS

U.S. Appl. No. 61/348,862, filed May 27, 2010.

(Continued)

*Primary Examiner* — Dangelino N Gortayo (57) ABSTRACT

A method for characterizing data elements in an enterprise including ascertaining at least one of an access metric and a data identifier for each of a plurality of data elements and employing the at least one of an access metric and a data identifier to automatically apply a metatag to ones of the plurality of data elements.

13 Claims, 6 Drawing Sheets

(56) References Cited

U.S. PATENT DOCUMENTS

| | | | |
|---|---|---|---|
| 5,899,991 A | 5/1999 | Karch | |
| 6,023,765 A | 2/2000 | Kuhn | |
| 6,308,173 B1 | 10/2001 | Glasser et al. | |
| 6,338,082 B1 | 1/2002 | Schneider | |
| 6,393,468 B1 | 5/2002 | McGee | |
| 6,772,350 B1 | 8/2004 | Belani et al. | |
| 6,928,439 B2 | 8/2005 | Satoh | |
| 7,007,032 B1 | 2/2006 | Chen et al. | |
| 7,017,183 B1 | 3/2006 | Frey et al. | |
| 7,031,984 B2 | 4/2006 | Kawamura et al. | |
| 7,068,592 B1 | 6/2006 | Duvaut et al. | |
| 7,107,538 B1* | 9/2006 | Hinckley | G06F 21/62 707/999.01 |
| 7,124,272 B1 | 10/2006 | Kennedy et al. | |
| 7,401,087 B2 | 7/2008 | Copperman et al. | |
| 7,403,925 B2 | 7/2008 | Schlesinger et al. | |
| 7,421,740 B2 | 9/2008 | Fey et al. | |
| 7,505,973 B2 | 3/2009 | Kapadia et al. | |
| 7,529,748 B2 | 5/2009 | Wen et al. | |
| 7,555,482 B2 | 6/2009 | Korkus | |
| 7,568,230 B2 | 7/2009 | Lieberman et al. | |
| 7,606,801 B2 | 10/2009 | Faitelson et al. | |
| 7,716,240 B2 | 5/2010 | Lim | |
| 7,720,858 B2 | 5/2010 | Dettinger et al. | |
| 7,743,420 B2 | 6/2010 | Shulman et al. | |
| 7,797,335 B2 | 9/2010 | Stern et al. | |
| 7,797,337 B2 | 9/2010 | Fry | |
| 7,801,894 B1 | 9/2010 | Bone et al. | |
| 7,844,582 B1 | 11/2010 | Arbilla et al. | |
| 7,882,098 B2 | 2/2011 | Prahlad et al. | |
| 7,890,530 B2 | 2/2011 | Bilger et al. | |
| 7,979,466 B2* | 7/2011 | Wagner | G06F 21/6218 707/781 |
| 8,171,050 B2 | 5/2012 | O'Halloran et al. | |
| 8,190,638 B2 | 5/2012 | Giampaolo et al. | |
| 8,239,351 B2 | 8/2012 | Hornqvist | |
| 8,239,925 B2 | 8/2012 | Faitelson et al. | |
| 8,250,048 B2 | 8/2012 | Yalamanchi et al. | |
| 8,285,748 B2 | 10/2012 | Thomas et al. | |
| 8,306,999 B2 | 11/2012 | Gass, III et al. | |
| 8,417,678 B2 | 4/2013 | Bone et al. | |
| 8,438,124 B2* | 5/2013 | Spivack | G06F 16/367 706/45 |
| 8,463,815 B1 | 6/2013 | Zoellner | |
| 8,521,766 B1 | 8/2013 | Hoarty | |
| 8,612,404 B2 | 12/2013 | Bone et al. | |
| 8,626,803 B2 | 1/2014 | Hsu et al. | |
| 8,799,225 B2 | 8/2014 | Valtzblit et al. | |
| 8,898,623 B2 | 11/2014 | Zhao et al. | |
| 10,037,358 B2 | 7/2018 | Faitelson et al. | |
| 10,296,596 B2 | 5/2019 | Faitelson et al. | |
| 2002/0002557 A1 | 1/2002 | Straube et al. | |
| 2002/0138631 A1* | 9/2002 | Friedel | H04L 63/102 709/229 |
| 2003/0048301 A1 | 3/2003 | Menninger | |
| 2003/0051026 A1 | 3/2003 | Carter et al. | |
| 2003/0188198 A1 | 10/2003 | Holdsworth et al. | |
| 2003/0231207 A1 | 12/2003 | Huang | |
| 2004/0030915 A1 | 2/2004 | Sameshima et al. | |
| 2004/0186809 A1 | 9/2004 | Schlesinger et al. | |
| 2004/0205342 A1 | 10/2004 | Roegner | |
| 2004/0249847 A1 | 12/2004 | Wang et al. | |
| 2004/0254919 A1 | 12/2004 | Giuseppini | |
| 2005/0044399 A1 | 2/2005 | Dorey | |
| 2005/0065823 A1 | 3/2005 | Ramraj et al. | |
| 2005/0086268 A1 | 4/2005 | Rogers | |
| 2005/0086529 A1 | 4/2005 | Buchsbaum | |
| 2005/0108206 A1 | 5/2005 | Lam et al. | |
| 2005/0120054 A1 | 6/2005 | Shulman et al. | |
| 2005/0172126 A1 | 8/2005 | Lange et al. | |
| 2005/0203881 A1 | 9/2005 | Sakamoto et al. | |
| 2005/0246762 A1 | 11/2005 | Girouard et al. | |
| 2005/0278334 A1 | 12/2005 | Fey et al. | |
| 2005/0278785 A1 | 12/2005 | Lieberman | |
| 2006/0064313 A1 | 3/2006 | Steinbarth et al. | |
| 2006/0075503 A1 | 4/2006 | Bunker et al. | |
| 2006/0090208 A1 | 4/2006 | Smith | |
| 2006/0184459 A1 | 8/2006 | Parida | |
| 2006/0184530 A1 | 8/2006 | Song et al. | |
| 2006/0271523 A1 | 11/2006 | Brookler et al. | |
| 2006/0277184 A1 | 12/2006 | Faitelson et al. | |
| 2006/0294578 A1 | 12/2006 | Burke et al. | |
| 2007/0033340 A1 | 2/2007 | Tulskie et al. | |
| 2007/0050366 A1 | 3/2007 | Bugir et al. | |
| 2007/0061487 A1 | 3/2007 | Moore et al. | |
| 2007/0073698 A1 | 3/2007 | Kanayama et al. | |
| 2007/0094265 A1 | 4/2007 | Korkus | |
| 2007/0101387 A1 | 5/2007 | Hua et al. | |
| 2007/0112743 A1 | 5/2007 | Giampaolo et al. | |
| 2007/0136291 A1* | 6/2007 | Bird | G06F 21/6227 |
| 2007/0156659 A1 | 7/2007 | Lim | |
| 2007/0156693 A1 | 7/2007 | Soin et al. | |
| 2007/0198608 A1 | 8/2007 | Prahlad et al. | |
| 2007/0203872 A1 | 8/2007 | Flinn et al. | |
| 2007/0214497 A1 | 9/2007 | Montgomery et al. | |
| 2007/0244899 A1 | 10/2007 | Faitelson et al. | |
| 2007/0261121 A1 | 11/2007 | Jacobson | |
| 2007/0266006 A1 | 11/2007 | Buss | |
| 2007/0276823 A1 | 11/2007 | Borden et al. | |
| 2007/0282855 A1 | 12/2007 | Chen et al. | |
| 2008/0005024 A1 | 1/2008 | Kirkwood | |
| 2008/0031447 A1 | 2/2008 | Geshwind et al. | |
| 2008/0034402 A1 | 2/2008 | Botz et al. | |
| 2008/0097998 A1 | 4/2008 | Herbach | |
| 2008/0162707 A1 | 7/2008 | Beck et al. | |
| 2008/0172720 A1 | 7/2008 | Botz et al. | |
| 2008/0201348 A1 | 8/2008 | Edmonds et al. | |
| 2008/0270462 A1 | 10/2008 | Thomsen | |
| 2008/0271157 A1 | 10/2008 | Faitelson et al. | |
| 2009/0031418 A1 | 1/2009 | Matsuda et al. | |
| 2009/0037558 A1 | 2/2009 | Stone et al. | |
| 2009/0077124 A1 | 3/2009 | Spivack et al. | |
| 2009/0100058 A1 | 4/2009 | Faitelson et al. | |
| 2009/0119298 A1 | 5/2009 | Faitelson et al. | |
| 2009/0150981 A1 | 6/2009 | Amies et al. | |
| 2009/0157570 A1 | 6/2009 | Pall et al. | |
| 2009/0163183 A1 | 6/2009 | ODonoghue et al. | |
| 2009/0182715 A1 | 7/2009 | Falkenberg | |
| 2009/0198892 A1 | 8/2009 | Alvarez et al. | |
| 2009/0249290 A1 | 10/2009 | Jenkins et al. | |
| 2009/0249446 A1 | 10/2009 | Jenkins et al. | |
| 2009/0265780 A1 | 10/2009 | Korkus et al. | |
| 2009/0282045 A1 | 11/2009 | Hsieh et al. | |
| 2009/0292930 A1 | 11/2009 | Marano et al. | |
| 2009/0320088 A1 | 12/2009 | Gill et al. | |
| 2010/0037324 A1 | 2/2010 | Grant et al. | |
| 2010/0057815 A1 | 3/2010 | Spivack et al. | |
| 2010/0070881 A1 | 3/2010 | Hanson et al. | |
| 2010/0100524 A1 | 4/2010 | Bae et al. | |
| 2010/0114977 A1 | 5/2010 | Bacher | |
| 2010/0174731 A1 | 7/2010 | Vermeulen et al. | |
| 2010/0185650 A1 | 7/2010 | Topaean et al. | |
| 2010/0235396 A1* | 9/2010 | Chaurasia | H04L 63/102 707/784 |
| 2010/0242083 A1* | 9/2010 | Begum | G06F 21/6218 726/1 |
| 2010/0257456 A1 | 10/2010 | Lieb et al. | |
| 2010/0299763 A1 | 11/2010 | Marcus et al. | |
| 2011/0010758 A1 | 1/2011 | Faitelson et al. | |
| 2011/0040793 A1 | 2/2011 | Davidson et al. | |
| 2011/0047466 A1 | 2/2011 | Michelman | |
| 2011/0060916 A1 | 3/2011 | Faitelson et al. | |
| 2011/0061093 A1 | 3/2011 | Korkus et al. | |
| 2011/0061111 A1 | 3/2011 | Faitelson et al. | |
| 2011/0184989 A1 | 7/2011 | Faitelson et al. | |
| 2011/0219028 A1 | 9/2011 | Dove et al. | |
| 2011/0247074 A1 | 10/2011 | Manring et al. | |
| 2011/0296490 A1 | 12/2011 | Faitelson et al. | |
| 2012/0054283 A1 | 3/2012 | Korkus et al. | |
| 2012/0173583 A1 | 7/2012 | Faitelsor et al. | |
| 2012/0179681 A1 | 7/2012 | Faitelson et al. | |
| 2012/0191646 A1 | 7/2012 | Faitelson et al. | |
| 2012/0221550 A1 | 8/2012 | Korkus et al. | |
| 2012/0271853 A1 | 10/2012 | Faitelson et al. | |

(56) References Cited

U.S. PATENT DOCUMENTS

| | | |
|---|---|---|
| 2012/0271855 A1 | 10/2012 | Faitelson et al. |
| 2012/0291100 A1 | 11/2012 | Faitelson et al. |
| 2018/0373762 A1 | 12/2018 | Faitelson et al. |

FOREIGN PATENT DOCUMENTS

| | | |
|---|---|---|
| CN | 101583953 | 11/2009 |
| CN | 101681405 | 3/2010 |
| EP | 1248178 | 10/2002 |
| WO | 2008073978 | 6/2008 |
| WO | 2008/111774 | 9/2008 |
| WO | 2011/030324 | 3/2011 |
| WO | 2011/092684 | 4/2011 |
| WO | 2011/092685 | 8/2011 |
| WO | 2011092686 | 8/2011 |
| WO | 2011/148364 | 12/2011 |
| WO | 2011/148375 | 12/2011 |
| WO | 2011/148376 | 12/2011 |
| WO | 2011/148377 | 12/2011 |
| WO | 2012/101620 | 8/2012 |
| WO | 2012/143920 | 10/2012 |

OTHER PUBLICATIONS

U.S. Appl. No. 61/348,829, filed May 27, 2010.
Notice of Allowance dated Aug. 2, 2013, which issued during the prosecution of U.S. Appl. No. 12/772,450.
Notice of Allowance dated Jan. 9, 2019, which issued during the prosecution of U.S. Appl. No. 13/384,465.
An English Translation of an Office Action dated Oct. 10, 2015, which issued during the prosecution of Chinese Patent Application No. 201180036674.1.
An English Translation of an Office Action dated Apr. 11, 2016, which issued during the prosecution of Chinese Patent Application No. 201180036152.1.
An English Translation of an Office Action dated Apr. 5, 2016, which issued during the prosecution of Chinese Patent Application No. 201180036674.1.
An English Translation of an Office Action dated Mar. 4, 2015, which issued during the prosecution of Chinese Patent Application No. 201180036152.1.
An English Translation of an Office Action dated Jan. 23, 2015, which issued during the prosecution of Chinese Patent Application No. 201180036674.1.
An English Translation of an Office Action dated Oct. 8, 2015, which issued during the prosecution of Chinese Patent Application No. 201180036152.1.
GENUNIX; "Writing Filesystems—VFS and Vnode Interfaces", 5 pages, Oct. 2007.
An English Translation of an Office Action dated Sep. 30, 2016, which issued during the prosecution of Chinese Patent Application No. 201180036152.1.
S.R. Kleiman; "Vnodes: An Architecture for Multiple File System Types in Sun UNIX", USENIX Association: Summer Conference Proceedings, Atlanta 1986; 10 pages.
An Office Action dated Aug. 13, 2015, which issued during the prosecution of Applicant's U.S. Appl. No. 13/384,465.
Varonis; "White Paper: The Business Case for Data Governance", dated Mar. 27, 2007, 8 pages.
An Office Action dated Aug. 16, 2018, which issued during the prosecution of Applicant's U.S. Appl. No. 13/384,465.
An Office Action dated Apr. 6, 2017 which issued during the prosecution of Applicant's European App No. 11786228.4.
An Office Action dated Jun. 14, 2017, which issued during the prosecution of Applicant's U.S. Appl. No. 13/384,459.
Findutils; GNU Project—Free Software Foundation (FSF), 3 pages, Nov. 2006.
An Office Action dated Jan. 9, 2017, which issued during the prosecution of Applicant's U.S. Appl. No. 13/384,465.
An Office Action dated Nov. 18, 2014, which issued during the prosecution of Applicant's U.S. Appl. No. 13/384,459.
An Office Action dated May 21, 2014, which issued during the prosecution of Applicant's U.S. Appl. No. 13/384,459.
An Office Action dated Dec. 8, 2017, which issued during the prosecution of Applicant's U.S. Appl. No. 13/384,459.
An Office Action dated Aug. 18, 2015, which issued during the prosecution of Applicant's U.S. Appl. No. 13/384,459.
An Office Action dated Apr. 14, 2016, which issued during the prosecution of Applicant's U.S. Appl. No. 13/384,459.
Notice of Allowance dated Mar. 28, 2018, which issued during the prosecution of Applicant's U.S. Appl. No. 13/384,459.
Notice of Allowance dated May 3, 2018, which issued during the prosecution of Applicant's U.S. Appl. No. 13/384,459.
European Search Report dated Feb. 27, 2014 which issued during the prosecution of Applicant's European App No. 11786228.4.
An International Preliminary Report on Patentability dated Nov. 27, 2012, which issued during the prosecution of Applicant's PCT/IL2011/000408.
Varonis; "Accelerating Audits with Automation: Understanding Who's Accessing Your Unstructured Data", Oct. 8, 2007, 7 pages.
An Office Action dated Mar. 7, 2016, which issued during the prosecution of Applicant's U.S. Appl. No. 13/384,465.
Alex Woodie; "Varonis Prevents Unauthorized Access to Unstructured Data", Four Hundred Stuff, vol. 7, No. 9, Jul. 31, 2007, 6 pages.
DatAdvantage User Guide by Varonis, Version 3.0, Jun. 20, 2007.
DatAdvantage User Guide by Varonis, Version 1.0, Aug. 30, 2005.
DatAdvantage User Guide by Varonis, Version 2.0, Aug. 24, 2006.
DatAdvantage User Guide by Varonis, Version 2.5, Nov. 27, 2006.
DatAdvantage User Guide by Varonis, Version 2.6, Dec. 15, 2006.
DatAdvantage User Guide by Varonis, Version 2.7, Feb. 6, 2007.
A List of database tables in DatAdvantage 2.7, Feb. 6, 2007.
A List of database tables in DatAdvantage 3.0, Jun. 20, 2007.
"Entitlement reviews: A Practitioner's Guide" by Varonis, 2007.
An Office Action dated Jul. 2, 2013, which issued during the prosecution of U.S. Appl. No. 13/413,748.
An Office Action dated Mar. 12, 2014, which issued during the prosecution of Applicant's U.S. Appl. No. 13/384,465.
Sahadeb De, et al; "Secure Access Control in a Multi-user Geodatabase," available on the Internet at the URL htto://www10.qiscafe.com. 2005, 10 pages.
An Office Action dated Jul. 9, 2010, which issued during the prosecution of Applicant's U.S. Appl. No. 11/789,884.
An Office Action dated Dec. 14, 2010, which issued during the prosecution of Applicant's U.S. Appl. No. 11/789,884.
An Office Action dated Dec. 14, 2010, which issued during the prosecution of Applicant's U.S. Appl. No. 11/786,522.
An English Translation of an Office Action dated Oct. 24, 2016, which issued during the prosecution Chinese Patent Application No. 201180036674.1.
An English Translation of a Notice of Reexamination dated Sep. 6, 2017, which issued during the prosecution of Chinese Patent Application No. 201180036674.1.
A Restriction Requirement dated Nov. 21, 2012, which issued during the prosecution of Applicant's U.S. Appl. No. 13/106,023.
An Office Action dated Sep. 14, 2012, which issued during the prosecution of U.S. Appl. No. 12/861,967.
An Office Action dated Mar. 13, 2012, which issued during the prosecution of U.S. Appl. No. 11/786,522.
An Office Action dated Aug. 28, 2012, which issued during the prosecution of Applicant's U.S. Appl. No. 12/673,691.
An Office Action dated Nov. 17, 2017, which issued during the prosecution of Applicant's U.S. Appl. No. 13/384,465.
An Office Action dated Jul. 5, 2012, which issued during the prosecution of Applicant's U.S. Appl. No. 12/772,450.
An International Search Report and a Written Opinion both dated May 23, 2011, which issued during the prosecution of Applicant's PCT/IL11/00065.
An International Search Report and a Written Opinion both dated May 20, 2010, which issued during the prosecution of Applicant's PCT/IL10/00069.

(56) References Cited

OTHER PUBLICATIONS

An International Search Report and a Written Opinion both dated May 24, 2011 which suedduring the prosecution of Applicant's PCT/IL11/00077.
An International Search Report and a Written Opinion both dated May 25, 2011, which issued during the prosecution of Applicant's PCT/IL11/00078.
An International Search Report and a Written Opinion both dated Jun. 14, 2011 which issued during the prosecution of Applicant's PCT/IL11/00066.
An International Search Report and a Written Opinion both dated Nov. 15, 2011, which issued during the prosecution of Applicant's PCT/IL11/00408.
An International Search Report and a Written Opinion both dated Oct. 1, 2012, which issued during the prosecution of Applicant's PCT/IL2012/000240.
An International Preliminary Report on Patentability dated Jul. 31, 2012, which issued during the prosecution of Applicant's PCT/IL2011/000065.
An International Preliminary Report on Patentability dated Mar. 13, 2012, which issued during the prosecution of Applicant's PCT/IL2010/000069.
An Office Action dated Sep. 29, 2014, which issued during the prosecution of Applicant's U.S. Appl. No. 13/384,465.
An International Preliminary Report on Patentability dated Jul. 31, 2012, which issued during the prosecution of Applicant's PCT/IL2011/000078.
An International Preliminary Report on Patentability dated Jul. 31, 2012, which issued during the prosecution of Applicant's PCT/IL2011/00066.
An Office Action dated Apr. 28, 2011, which issued during the prosecution of Applicant's U.S. Appl. No. 11/871,028.
An Office Action dated Sep. 16, 2010, which issued during the prosecution of Applicant's U.S. Appl. No. 11/871,028.
An Office Action dated Jan. 16, 2013, which issued during the prosecution of Applicant's U.S. Appl. No. 13/413,748.
An Office Action dated Oct. 31, 2008, which issued during the prosecution of Applicant's U.S. Appl. No. 11/635,736.
An Office Action dated Jul. 11, 2012, which issued during the prosecution of Applicant's U.S. Appl. No. 13/014,762.
Sara C. Madeira and Arlindo L. Oliveira; Biclustering Algorithms for Biological data Analysis: A Survey; Mar. 2004; http://www.cs.princeton.edu/courses/archive/spr05/cos598E/bib/bicluster.pdf.
Sara C. Madeira; Clustering, Fuzzy Clustering and Biclustering: An Overview; p. 31 to 53, Jun. 27, 2003.
Edgar Weippl, et al; "Content-based Management of Document Access", 14th International Conference on Applications of Prolog (INAP), 2001, 9 pages.
U.S. Appl. No. 60/688,486, filed Jun. 7, 2005.
U.S. Appl. No. 61/240,726, filed Sep. 9, 2009.
An English Translation of an Office Action dated Sep. 14, 2012, which issued during the prosecution of German Patent Application No. 11 2006 001 378.5.
An Office Action dated Jun. 22, 2012, which issued during the prosecution of Applicant's U.S. Appl. No. 12/814,807.
An Office Action dated Aug. 1, 2008, which issued during the prosecution of Applicant's U.S. Appl. No. 11/258,256.
An Interview Summary dated Nov. 6, 2015, which issued during the prosecution of U.S. Appl. No. 13/384,459.
An Interview Summary dated Mar. 2, 2018, which issued during the prosecution of U.S. Appl. No. 13/384,459.
An Interview Summary dated Jul. 17, 2017,which issued during the prosecution of U.S. Appl. No. 13/384,459.
An Office Action dated Jan. 30, 2013, which issued during the prosecution of Applicant's U.S. Appl. No. 12/772,450.
An Office Action dated Feb. 12, 2008, which issued during the prosecution of Applicant's U.S. Appl. No. 11/258,256.
An International Search Report and a Written Opinion both dated Apr. 13, 2012 which issued during the prosecution of Applicant's PCT/IL11/00902.
Notice of Allowance dated Apr. 12, 2012, which issued during the prosecution of Applicant's U.S. Appl. No. 11/786,522.
An Interview Summary dated Dec. 5, 2014, which issued during the prosecution of U.S. Appl. No. 13/384,459.
An Interview Summary dated Jun. 2, 2016, which issued during the prosecution of U.S. Appl. No. 13/384,459.
An Interview Summary dated Sep. 5, 2014, which issued during the prosecution of U.S. Appl. No. 13/384,459.
Suto, Augmenting the Core Functionality of an e-Science Grid Multi-Tier Front-End: GridSphere-based Reengineering of EPIC; Dec. 2004 [retrieved on Oct. 15, 2011].
Stagni, on Usage Control for Data Grids: Models, Architecture, and Specifications, Mar. 2009, [Retrieved on Oct. 15, 2011].
An Interview Summary dated Apr. 15, 2014, which issued during the prosecution of U.S. Appl. No. 13/384,465.
An Interview Summary dated Dec. 5, 2014, which issued during the prosecution of U.S. Appl. No. 13/384,465.
An Interview Summary dated Jul. 17,2017, which issued during the prosecution of U.S. Appl. No. 13/384,465.
An Interview Summary dated Jun. 2, 2016, which issued during the prosecution of U.S. Appl. No. 13/384,465.
An Interview Summary dated Mar. 2, 2018, which issued during the prosecution of U.S. Appl. No. 13/384,465.
An Interview Summary dated May 13, 2015, which issued during the prosecution of U.S. Appl. No. 13/384,465.
An Interview Summary dated Nov. 6, 2015, which issued during the prosecution of U.S. Appl. No. 13/384,465.
An Interview Summary dated Oct. 19, 2018, which issued during the prosecution of U.S. Appl. No. 13/384,465.
An Interview Summary dated Sep. 8, 2014, which issued during the prosecution of U.S. Appl. No. 13/384,465.
An Advisory Action dated Nov. 14, 2016, which issued during the prosecution of U.S. Appl. No. 13/384,459.
An International Search Report and a Written Opinion both dated Nov. 3, 2011, which issued during the prosecution of Applicant's PCT/IL2011/000409.
An International Preliminary Report on Patentability dated Nov. 27, 2012, which issued during the prosecution of Applicant's PCT/IL2011/000409.
An Advisory Action dated Jan. 12, 2015, which issued during the prosecution of U.S. Appl. No. 13/384,465.
An Advisory Action dated Mar. 27, 2018, which issued during the prosecution of U.S. Appl. No. 13/384,465.
An Office Action dated Jan. 8, 2019, which issued during the prosecution of Applicant's Indian Patent Application No. 2831/MUMNP/2012.
An Office Action dated Oct. 7, 2019, which issued during the prosecution of Applicant's Indian Patent Application No. 2881/MUMNP/2012.
An International Search Report and a Written Opinion both dated Aug. 31, 2012 which issued during the prosecution of Applicant's PCT/IL2012/000163.
An Office Action dated Dec. 24, 2012, which issued during the prosecution of U.S. Appl. No. 12/861,059.
An Office Action dated Jul. 10, 2012, which issued during the prosecution of U.S. Appl. No. 12/861,059.
European Search Report dated Feb. 27, 2014 which issued during the prosecution of Applicant's European App No. 11786229.2.
An Office Action dated Jan. 15, 2013, which issued during the prosecution of U.S. Appl. No. 13/159,903.
An Office Action dated Sep. 19, 2012, which issued during the prosecution of U.S. Appl. No. 13/303,826.
An International Search Report and a Written Opinion both dated Nov. 2, 2011, which issued during the prosecution of Applicant's PCT/IL2011/000407.
An International Preliminary Report on Patentability dated Nov. 27, 2012, which issued during the prosecution of Applicant's PCT/IL2011/000407.
An International Search Report and a Written Opinion both dated Jun. 13, 2011 which issued during the prosecution of Applicant's PCT/IL11/00076.

(56) References Cited

OTHER PUBLICATIONS

An International Preliminary Report on Patentability dated Nov. 27, 2012 which issued during the prosecution of Applicant's PCT/IL11/000076.

* cited by examiner

DATA TAGGING

REFERENCE TO RELATED APPLICATIONS

Reference is made to U.S. Provisional Patent Application Ser. No. 61/348,829, filed May 27, 2010 and entitled "DATA MANAGEMENT USING DATA TAGGING", the disclosure of which is hereby incorporated by reference and priority of which is hereby claimed pursuant to 37 CFR 1.78(a) (4) and (5)(i).

Reference is also made to U.S. patent application Ser. No. 13/014,762, filed Jan. 27, 2011, and entitled "AUTOMATIC RESOURCE OWNERSHIP ASSIGNMENT SYSTEMS AND METHODS", the disclosure of which is hereby incorporated by reference and priority of which is hereby claimed pursuant to 37 CFR 1.78(a) (1) and (2)(i).

Reference is also made to U.S. patent application Ser. No. 13/106,023, filed May 12, 2011, and entitled "AUTOMATIC RESOURCE OWNERSHIP ASSIGNMENT SYSTEM AND METHOD", the disclosure of which is hereby incorporated by reference and priority of which is hereby claimed pursuant to 37 CFR 1.78(a) (1) and (2)(i).

Reference is also made to the following patents and patent applications, owned by assignee, the disclosures of which are hereby incorporated by reference:

U.S. Pat. Nos. 7,555,482 and 7,606,801;

U.S. Published Patent Application Nos. 2007/0244899, 2008/0271157, 2009/0100058, 2009/0119298; 2009/0265780; 2011/0060916 and 2011/0061111; and U.S. patent application Ser. No. 12/673,691.

FIELD OF THE INVENTION

The present invention relates to improved systems and methodologies for data tagging.

BACKGROUND OF THE INVENTION

The following patent publications are believed to represent the current state of the art:

U.S. Pat. Nos. 5,465,387; 5,899,991; 6,338,082; 6,393,468; 6,928,439; 7,031,984; 7,068,592; 7,403,925; 7,421,740; 7,555,482, 7,606,801 and 7,743,420; and U.S. Published Patent Application Nos.: 2003/0051026; 2004/0249847; 2005/0108206; 2005/0203881; 2005/0086529; 2006/0064313; 2006/0184530; 2006/0184459; 2007/0203872; 2007/0244899; 2008/0271157; 2009/0100058; 2009/0119298 and 2009/0265780.

SUMMARY OF THE INVENTION

The present invention provides improved systems and methodologies for data tagging.

There is thus provided in accordance with a preferred embodiment of the present invention a method for characterizing data elements in an enterprise including ascertaining at least one of an access metric and a data identifier for each of a plurality of data elements and employing the at least one of an access metric and a data identifier to automatically apply a metatag to ones of the plurality of data elements.

Preferably, the method for characterizing data elements in an enterprise also includes ascertaining an owner for each of the plurality of data elements and requiring the owner to review and validate the metatags automatically applied to ones of the plurality of data elements of which he is the owner.

In accordance with a preferred embodiment of the present invention the employing includes automatically applying specific ones of a plurality of different metatags to specific ones of the plurality of data elements. Additionally or alternatively, the employing includes automatically applying to each one of the plurality of data elements a metatag previously applied to a parent folder thereof.

Preferably, the data identifier is one of file type, author, category and language.

In accordance with a preferred embodiment of the present invention the method for characterizing data elements in an enterprise also includes maintaining a database of access metrics for the each of a plurality of data elements. Additionally or alternatively, the method for characterizing data elements in an enterprise also includes maintaining a database of data identifiers for the each of a plurality of data elements.

Preferably, the employing includes employing an access metric and a data identifier to automatically apply a metatag to ones of the plurality of data elements. Alternatively, the employing includes employing an access metric to automatically apply a metatag to ones of the plurality of data elements. In another alternative embodiment the employing includes employing a data identifier to automatically apply a metatag to ones of the plurality of data elements.

There is also provided in accordance with another preferred embodiment of the present invention a method for characterizing data elements in an enterprise including ascertaining at least one of an access metric and a data identifier for each of a plurality of data elements and employing the at least one of an access metric and a data identifier to automatically recommend application of metatags to the plurality of data elements.

Preferably, the employing includes automatically recommending application of specific ones of a plurality of different metatags to specific ones of the plurality of data elements. Additionally or alternatively, the employing includes automatically recommending application to each of the plurality of data elements a metatag previously applied to a parent folder thereof.

In accordance with a preferred embodiment of the present invention the method for characterizing data elements in an enterprise also includes ascertaining an owner for each of the plurality of data elements and requiring the owner to review and validate application of the recommended metatags to ones of the plurality of data elements of which he is the owner.

Preferably, the data identifier is one of file type, author, category and language.

In accordance with a preferred embodiment of the present invention the method for characterizing data elements in an enterprise also includes maintaining a database of access metrics for the each of a plurality of data elements. Additionally or alternatively, the method for characterizing data elements in an enterprise also includes maintaining a database of data identifiers for the each of a plurality of data elements.

Preferably, the employing includes employing an access metric and a data identifier to automatically recommend application of a metatag to ones of the plurality of data elements. Alternatively, the employing includes employing an access metric to automatically recommend application of metatags to the plurality of data elements. In another alternative embodiment, the employing includes employing a data identifier to automatically recommend application of metatags to the plurality of data elements.

There is yet further provided in accordance with still another preferred embodiment of the present invention a method for characterizing data elements in an enterprise including ascertaining an owner for each of a plurality of data elements and requiring the owner to apply at least one metatag to ones of the plurality of data elements of which he is the owner.

In accordance with a preferred embodiment of the present invention the method for characterizing data elements in an enterprise also includes maintaining a database of access metrics for the each of a plurality of data elements. Additionally or alternatively, the method for characterizing data elements in an enterprise also includes maintaining a database of data identifiers for the each of a plurality of data elements.

There is even further provided in accordance with a further preferred embodiment of the present invention a method for characterizing data elements in an enterprise including ascertaining an owner for each of a plurality of data elements and requiring the owner to review and validate metatags applied to ones of the plurality of data elements of which he is the owner.

In accordance with a preferred embodiment of the present invention the method for characterizing data elements in an enterprise also includes maintaining a database of access metrics for the each of a plurality of data elements. Additionally or alternatively, the method for characterizing data elements in an enterprise also includes maintaining a database of data identifiers for the each of a plurality of data elements.

There is also provided in accordance with yet another preferred embodiment of the present invention a method for characterizing data elements in an enterprise including ascertaining an owner for each of a plurality of data elements and automatically recommending application of metatags by the owner to the plurality of data elements of which he is the owner.

In accordance with a preferred embodiment of the present invention the method for characterizing data elements in an enterprise also includes maintaining a database of access metrics for the each of a plurality of data elements. Additionally or alternatively, the method for characterizing data elements in an enterprise also includes maintaining a database of data identifiers for the each of a plurality of data elements.

There is further provided in accordance with still another preferred embodiment of the present invention a method of operating a file system including maintaining a data owner/administrator accessible database of metatags assigned by data owner/administers to a plurality of data elements; applying the metatags to the plurality of data elements in a storage platform and automatically synchronizing the metatags applied to the plurality of data elements and the database.

There is still further provided in accordance with another preferred embodiment of the present invention a system for characterizing data elements in an enterprise including access metrics collection functionality operative to collect access metrics associated with a plurality of data elements, metadata collection functionality operative to collect metadata associated with the plurality of data elements and metatag application functionality operative to utilize the access metrics collection functionality and the metadata collection functionality to automatically employ at least one of an access metric and a data identifier to automatically apply a metatag to ones of the plurality of data elements.

Preferably, the system for characterizing data elements in an enterprise also includes metatag owner validation functionality operative to ascertain owners of each of the plurality of data elements and to require each of the owners to review and validate the metatags automatically applied to ones of the plurality of data elements of which he is the owner.

In accordance with a preferred embodiment of the present invention the metatag application functionality is also operative to automatically apply specific ones of a plurality of different metatags to specific ones of the plurality of data elements. Additionally or alternatively, the metatag application functionality is also operative to automatically apply to each one of the plurality of data elements a metatag previously applied to a parent folder thereof.

Preferably, the data identifier is one of file type, author, category and language.

In accordance with a preferred embodiment of the present invention the system for characterizing data elements in an enterprise also includes an access metrics database which stores the access metrics collected by the access metrics collection functionality. Additionally or alternatively, the system for characterizing data elements in an enterprise and also includes a metadata database which stores the metadata collected by the metadata collection functionality.

Preferably, the metatag application functionality is also operative to utilize the access metrics collection functionality and the metadata collection functionality to automatically employ an access metric and a data identifier to automatically apply a metatag to ones of the plurality of data elements. Alternatively, the metatag application functionality is also operative to utilize the access metrics collection functionality to automatically employ an access metric to automatically apply a metatag to ones of the plurality of data elements. In another alternative embodiment, the metatag application functionality is also operative to utilize the metadata collection functionality to automatically employ a data identifier to automatically apply a metatag to ones of the plurality of data elements.

There is yet further provided in accordance with still another preferred embodiment of the present invention a system for characterizing data elements in an enterprise including access metrics collection functionality operative to collect access metrics associated with a plurality of data elements, metadata collection functionality operative to collect metadata associated with the plurality of data elements and metatag recommendation functionality operative to utilize the access metrics collection functionality and the metadata collection functionality to automatically employ at least one of an access metric and a data identifier to automatically recommend application of a metatag to ones of the plurality of data elements.

Preferably, the metatag recommendation functionality is also operative to automatically recommend application of specific ones of a plurality of different metatags to specific ones of the plurality of data elements. Additionally or alternatively, the metatag recommendation functionality is also operative to automatically recommend applying to each one of the plurality of data elements a metatag previously applied to a parent folder thereof.

In accordance with a preferred embodiment of the present invention the system for characterizing data elements in an enterprise also includes metatag owner validation functionality operative to ascertain owners of each of the plurality of data elements and to require each of the owners to review and validate application of the recommended metatags to ones of the plurality of data elements of which he is the owner.

Preferably, the data identifier is one of file type, author, category and language.

In accordance with a preferred embodiment of the present invention the system for characterizing data elements in an enterprise also includes an access metrics database which stores the access metrics collected by the access metrics collection functionality. Additionally or alternatively, the system for characterizing data elements in an enterprise also includes a metadata database which stores the metadata collected by the metadata collection functionality.

Preferably, the metatag recommendation functionality is also operative to utilize the access metrics collection functionality and the metadata collection functionality to automatically employ an access metric and a data identifier to automatically recommend application of a metatag to ones of the plurality of data elements. Alternatively, the metatag recommendation functionality is also operative to utilize the access metrics collection functionality to automatically employ an access metric to automatically recommend application of a metatag to ones of the plurality of data elements. In another alternative embodiment the metatag recommendation functionality is also operative to utilize the metadata collection functionality to automatically employ a data identifier to automatically recommend application of a metatag to ones of the plurality of data elements.

There is even further provided in accordance with yet another preferred embodiment of the present invention a system for characterizing data elements in an enterprise including metatag owner validation functionality operative to ascertain owners of each of the plurality of data elements and to require each of the owners apply at least one metatag to ones of the plurality of data elements of which he is the owner.

Preferably, the system for characterizing data elements in an enterprise also includes an access metrics database which stores access metrics associated with the plurality of data elements. Additionally or alternatively, the system for characterizing data elements in an enterprise also includes a metadata database which stores metadata associated with the plurality of data elements.

There is also provided in accordance with still another preferred embodiment of the present invention a system for characterizing data elements in an enterprise including metatag owner validation functionality operative to ascertain owners of each of a plurality of data elements and to require each of the owners to review and validate application of metatags to ones of the plurality of data elements of which he is the owner.

In accordance with a preferred embodiment of the present invention the system for characterizing data elements in an enterprise also includes an access metrics database which stores access metrics associated with the plurality of data elements. Additionally or alternatively, the system for characterizing data elements in an enterprise also includes a metadata database which stores metadata associated with the plurality of data elements.

There is yet further provided in accordance with yet another preferred embodiment of the present invention a system for characterizing data elements in an enterprise including metatag owner validation functionality operative to ascertain owners of each of a plurality of data elements and to recommend application of metatags by each of the owners to ones of the plurality of data elements of which he is the owner.

Preferably, the system for characterizing data elements in an enterprise also includes an access metrics database which stores access metrics associated with the plurality of data elements. Additionally or alternatively, the system for characterizing data elements in an enterprise also includes a metadata database which stores metadata associated with the plurality of data elements.

There is still further provided in accordance with another preferred embodiment of the present invention a system of operating a file system including a data owner/administrator accessible database of metatags assigned by data owner/administers to a plurality of data elements, metatag application functionality operative to apply the metatags to the plurality of data elements in a storage platform and synchronizing functionality operative to automatically synchronize the metatags applied to the plurality of data elements and the database.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
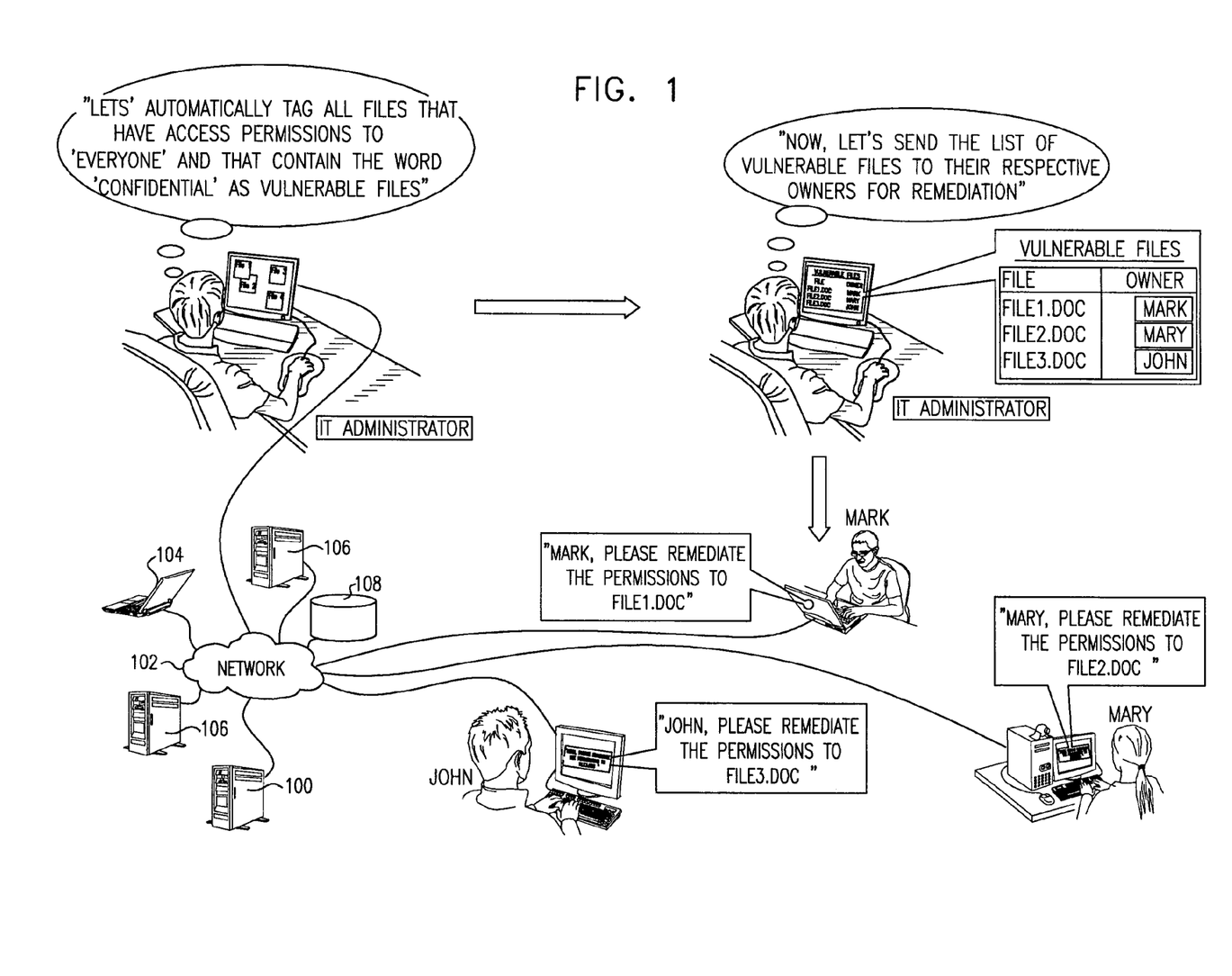
FIG. 1 is a simplified pictorial illustration of an example of the operation of an automatic data tagging system constructed and operative in accordance with a preferred embodiment of the present invention.

Reference is now made to FIG. 1, which is a simplified pictorial illustration of an example of the operation of an automatic data tagging system constructed and operative in accordance with a preferred embodiment of the present invention. The automatic data tagging system of FIG. 1 is preferably suitable for operating in an enterprise computer network including multiple disparate clients, data elements, computer hardware resources and computer software resources.

The operation of the automatic data tagging system of FIG. 1 preferably includes characterizing data elements in an enterprise by ascertaining at least one of an access metric and a data identifier for each of a plurality of data elements, and employing the at least one of an access metric and a data identifier to automatically apply a metatag to ones of the plurality of data elements. The operation of the automatic data tagging system also preferably includes ascertaining an owner for each of the plurality of data elements and requiring the owner to review and validate the metatags automatically applied to ones of the plurality of data elements of which he is the owner.

The term "data identifier" is used throughout to refer to metadata associated with a data element. The data identifier may be a content-based data identifier or a non content-based data identifier. A content-based data identifier associated with a data element preferably includes, for example, keywords or an abstract of the content of the data element. A non content-based data identifier associated with a data element preferably includes characteristics associated with the data element such as, for example, file type, author, category and language. A non content-based data identifier associated with a data element may also include one or more non content-based data identifiers associated with a parent folder of the data element. It is appreciated that the metadata may comprise predefined characteristics provided by the system which hosts the data elements or user-defined characteristics.

The term "metatag" is used throughout to refer to a metadata tag which is associated with a data element. Metatags are useful, for example, for automating data management tasks and for identifying data elements which may be grouped or categorized together for purposes of automatic or manual data management tasks.

The automatic data tagging system of FIG. 1 typically resides on an a server 100 that is connected to an enterprise computer network 102 which preferably includes multiple disparate clients 104, servers 106 and data storage resources 108. Typically, data elements, such as computer files, reside on servers 106 and on data storage resources 108 and are accessible to users of the network 102 in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 1, an IT Administrator of enterprise network 102 decides to utilize the automatic data tagging system residing on server 100 to automatically tag a subset of files which files have access permissions to the 'Everyone' group and contain the term 'confidential' as being vulnerable files. The Administrator then decides to send a list of the vulnerable files to their respective owners for access permissions remediation. In the example of FIG. 1 access permissions remediation may include, for example, modification of the access permissions of the file to include access permissions only to trusted individuals who require ongoing access to the file.

Figure 2:
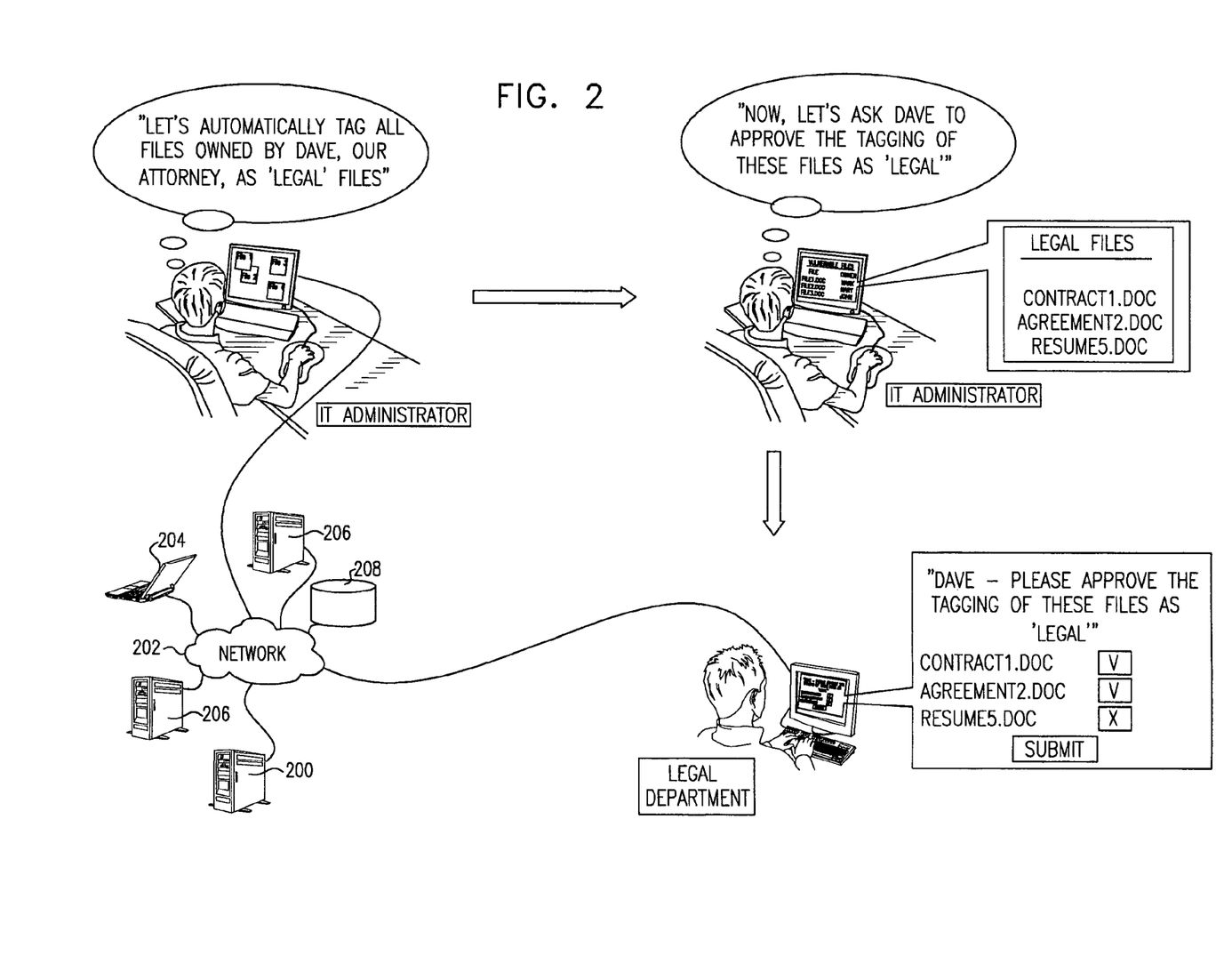
FIG. 2 is a simplified pictorial illustration of an example of the operation of an automatic data tagging system constructed and operative in accordance with another preferred embodiment of the present invention.

Reference is now made to FIG. 2, which is a simplified pictorial illustration of an example of the operation of an automatic data tagging system constructed and operative in accordance with another preferred embodiment of the present invention. The automatic data tagging system of FIG. 2 is preferably suitable for operating in an enterprise computer network including multiple disparate clients, data elements, computer hardware resources and computer software resources.

The operation of the automatic data tagging system of FIG. 2 preferably includes characterizing data elements in an enterprise by ascertaining at least one of an access metric and a data identifier for each of a plurality of data elements, and employing the at least one of an access metric and a data identifier to automatically apply a metatag to ones of the plurality of data elements. The operation of the automatic data tagging system also preferably includes ascertaining an owner for each of the plurality of data elements, and requiring the owner to review and validate the metatags automatically applied to ones of the plurality of data elements of which he is the owner.

The automatic data tagging system of FIG. 2 typically resides on an a server 200 that is connected to an enterprise computer network 202 which preferably includes multiple disparate clients 204, servers 206 and data storage resources 208. Typically, data elements, such as computer files, reside on servers 206 and on data storage resources 208 and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 2, an IT Administrator of enterprise network 202 decides to utilize the automatic data tagging system residing on server 200 to automatically tag a subset of files which files are owned by Dave, the company attorney, as being 'legal' files. The Administrator then decides to send a list of the legal files to Dave, requesting Dave to ascertain and confirm that the files tagged as 'legal' are actually legal-related files. As seen in FIG. 2, Dave ascertains and confirms that the file Contract1.doc and Agreement2.doc are actually legal-related files, while Resume5.doc is not legal-related, and therefore should not be tagged as 'legal'.

Figure 3:
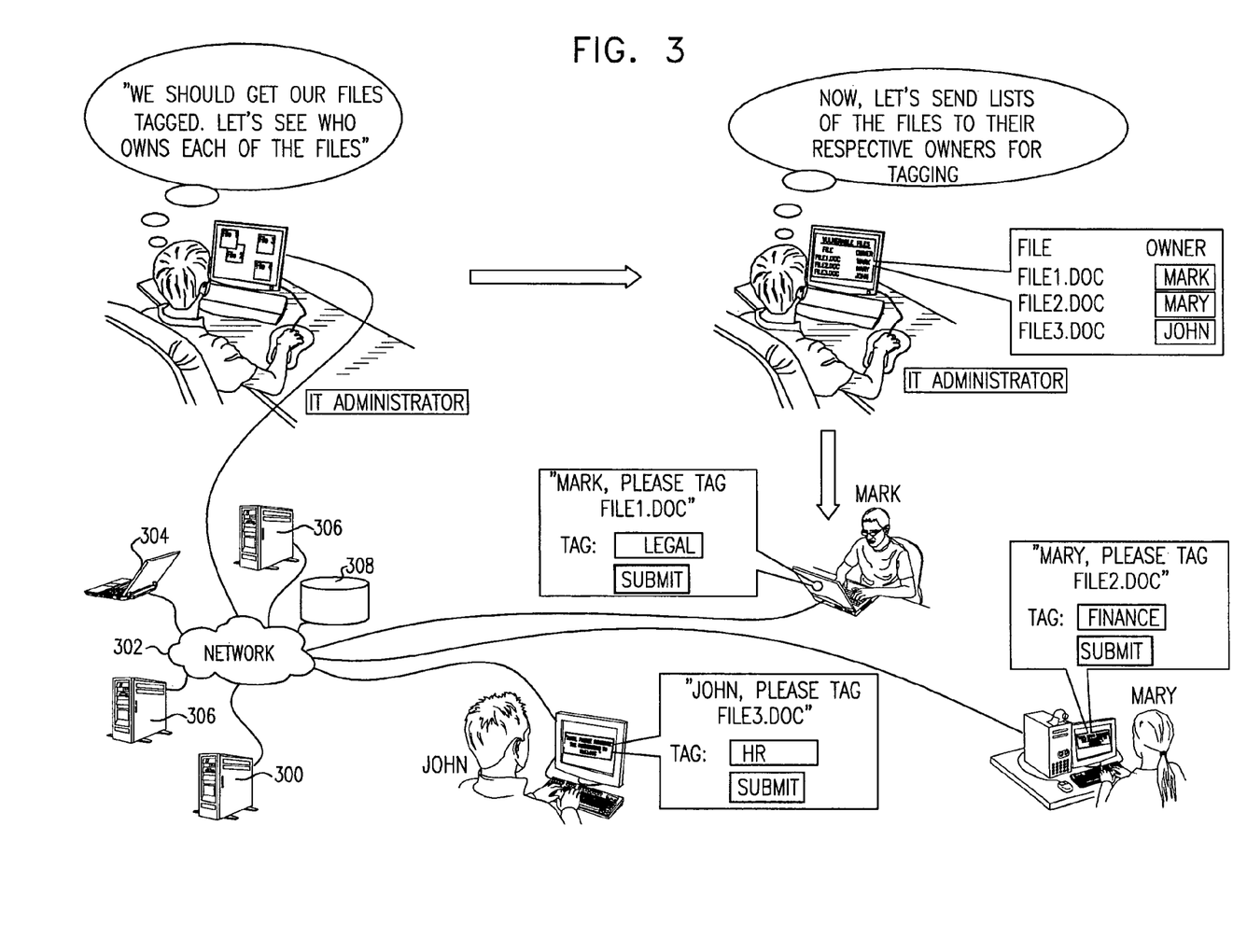
FIG. 3 is a simplified pictorial illustration of an example of the operation of an automatic data tagging system constructed and operative in accordance with yet another preferred embodiment of the present invention.

Reference is now made to FIG. 3, which is a simplified pictorial illustration of an example of the operation of an automatic data tagging system constructed and operative in accordance with yet another preferred embodiment of the present invention. The automatic data tagging system of FIG. 3 is preferably suitable for operating in an enterprise computer network including multiple disparate clients, data elements, computer hardware resources and computer software resources.

The operation of the automatic data tagging system of FIG. 3 preferably includes characterizing data elements in an enterprise by ascertaining an owner for each of a plurality of data elements, and requiring the owner to apply metatags to ones of the plurality of data elements of which he is the owner.

The automatic data tagging system of FIG. 3 typically resides on an a server 300 that is connected to an enterprise computer network 302 which preferably includes multiple disparate clients 304, servers 306 and data storage resources 308. Typically, data elements, such as computer files, reside on servers 306 and on data storage resources and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 3, an IT Administrator of enterprise network 302 decides to request from all owners of a subset of files to manually tag the files. The Administrator utilizes the system residing on server 300 to automatically ascertain the owners of the files and to send a request to each owner to tag their respectively owned files. As seen in FIG. 3, upon receiving the request, each file owner tags their respectively owned files.

Figure 4:
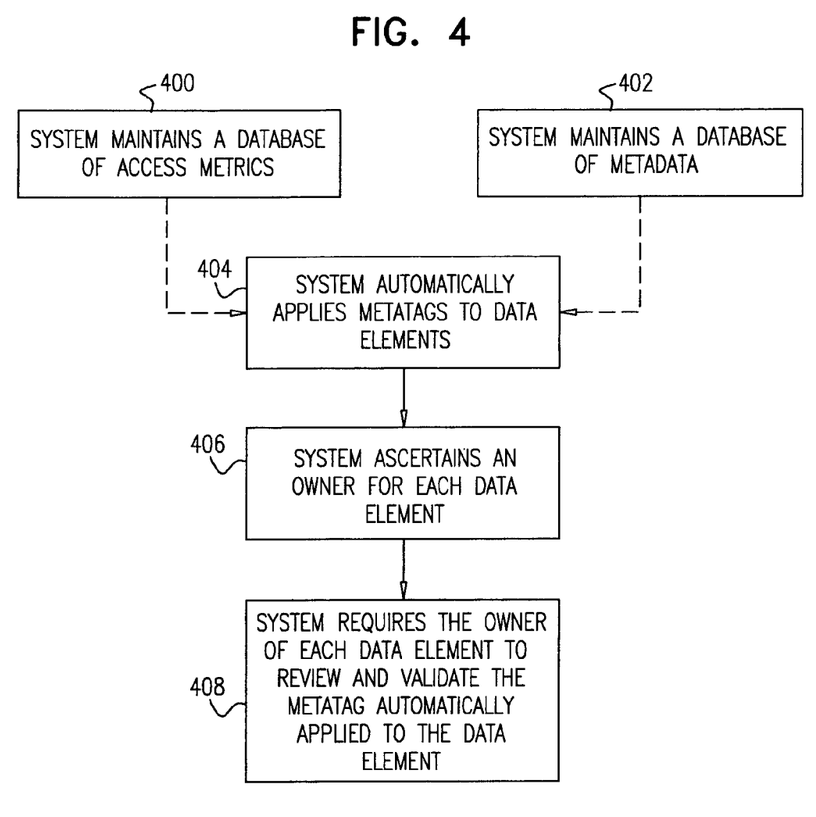
FIG. 4 is a simplified flowchart indicating steps in the operation of an automatic data tagging system constructed and operative in accordance with a preferred embodiment of the present invention.

Reference is now made to FIG. 4, which is a simplified flowchart indicating steps in the operation of an automatic data tagging system constructed and operative in accordance with a preferred embodiment of the present invention. The automatic data tagging system of FIG. 4 is preferably suitable for operating in an enterprise computer network including multiple disparate clients, data elements, computer hardware resources and computer software resources.

The operation of the automatic data tagging system of FIG. 4 preferably includes characterizing data elements in an enterprise by ascertaining at least one of an access metric and a data identifier for each of a plurality of data elements, and employing the at least one of an access metric and a data identifier to automatically apply a metatag to ones of the plurality of data elements. The operation of the automatic data tagging system also preferably includes ascertaining an owner for each of the plurality of data elements, and requiring the owner to review and validate the metatags automatically applied to ones of the plurality of data elements of which he is the owner.

The automatic data tagging system of FIG. 4 typically resides on a server that is connected to an enterprise computer network which preferably includes multiple disparate clients, servers and data storage resources. Typically, data elements, such as computer files, reside on servers and on data storage resources and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 4, the system preferably continuously maintains a database of access metrics which include actual access and access permissions of every user to every data element in the enterprise (400). The system also preferably continuously crawls over at least a subset of all data elements in the enterprise and maintains a database of metadata associated with each of the subset of data elements (402). Preferably, the system utilizes the database of stored access metrics and the database of metadata to automatically apply a metatag to each of the subset of data elements (404). Alternatively, the system may automatically apply the metatag assigned to the parent folder of each of the subset of data elements to the data element.

Additionally, the system preferably ascertains an owner for each of the subset of data elements (406), and requires the owner of each of the subset of data elements to review and validate the metatag automatically applied to the data element (408).

Figure 5:
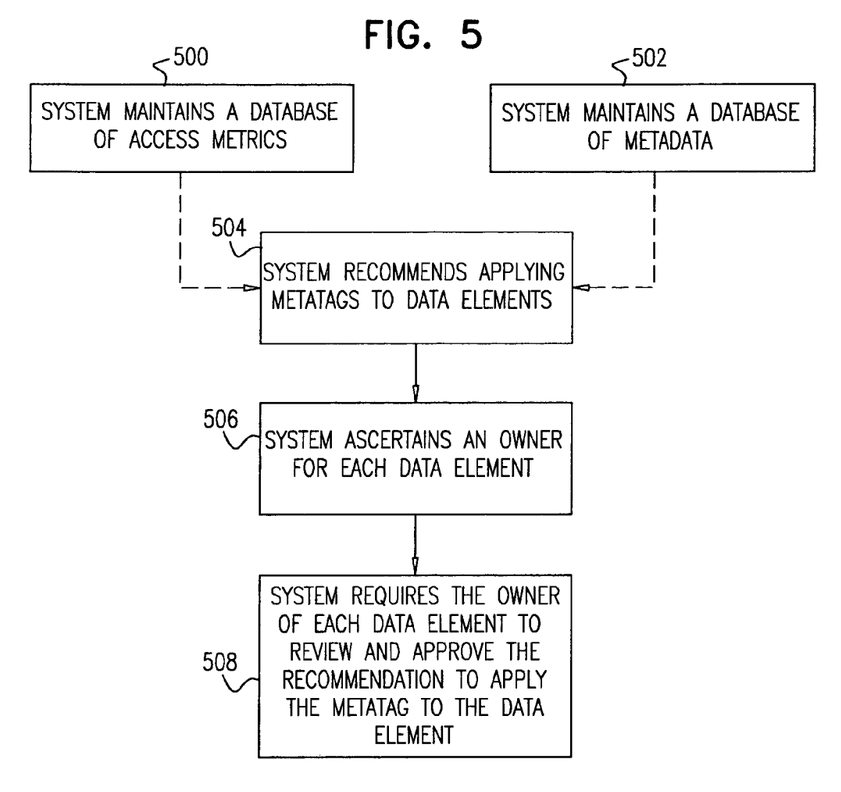
FIG. 5 is a simplified flowchart indicating steps in the operation of an automatic data tagging system constructed and operative in accordance with another preferred embodiment of the present invention.

Reference is now made to FIG. 5, which is a simplified flowchart indicating steps in the operation of an automatic data tagging system constructed and operative in accordance with another preferred embodiment of the present invention. The automatic data tagging system of FIG. 5 is preferably suitable for operating in an enterprise computer network including multiple disparate clients, data elements, computer hardware resources and computer software resources.

The operation of the automatic data tagging system of FIG. 5 preferably includes characterizing data elements in an enterprise by ascertaining at least one of an access metric and a data identifier for each of a plurality of data elements, and employing the at least one of an access metric and a data identifier to automatically recommend application of metatags to the plurality of data elements. Preferably, the recommending of application of metatags to the plurality of data elements includes automatically recommending application of specific ones of a plurality of different metatags to specific ones of said plurality of data elements.

The automatic data tagging system of FIG. 5 typically resides on a server that is connected to an enterprise computer network which preferably includes multiple disparate clients, servers and data storage resources. Typically, data elements, such as computer files, reside on servers and on data storage resources and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 5, the system preferably continuously maintains a database of access metrics which include actual access and access permissions of every user to every data element in the enterprise (500). The system also preferably continuously crawls over at least a subset of all data elements in the enterprise and maintains a database of metadata associated with each of the subset of data elements (502). Preferably, the system utilizes the database of stored access metrics and the database of metadata to recommend applying at least one metatag to each of the subset of data elements (504).

Additionally, the system preferably ascertains an owner for each of the subset of data elements (506), and requires the owner of each of the subset of data elements to review and approve the recommendation to apply the at least one metatag to the data element (508).

Figure 6:
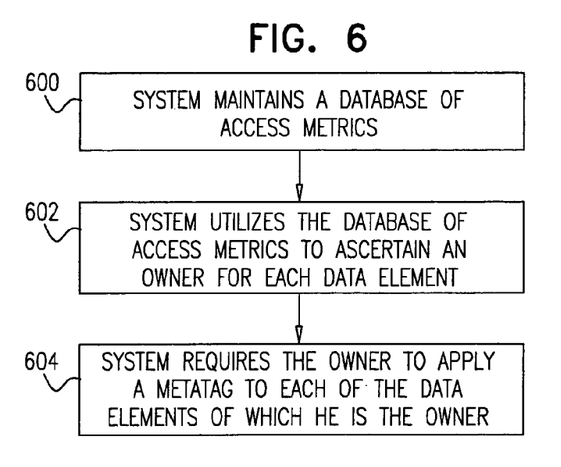
FIG. 6 is a simplified flowchart indicating steps in the operation of an automatic data tagging system constructed and operative in accordance with yet another preferred embodiment of the present invention.

Reference is now made to FIG. 6, which is a simplified flowchart indicating steps in the operation of an automatic data tagging system constructed and operative in accordance with yet another preferred embodiment of the present invention. The automatic data tagging system of FIG. 6 is preferably suitable for operating in an enterprise computer network including multiple disparate clients, data elements, computer hardware resources and computer software resources.

The operation of the automatic data tagging system of FIG. 6 preferably includes characterizing data elements in an enterprise by ascertaining an owner for each of a plurality of data elements, and requiring the owner to apply metatags to ones of the plurality of data elements of which he is the owner.

The automatic data tagging system of FIG. 6 typically resides on a server that is connected to an enterprise computer network which preferably includes multiple disparate clients, servers and data storage resources. Typically, data elements, such as computer files, reside on servers and on data storage resources and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

Preferably, the system continuously maintains a database of actual access and access permissions of every user to every data element in the enterprise. This functionality is described in U.S. Pat. No. 7,606,801, in U.S. Published Patent Application 2009/0265780 and in U.S. patent application Ser. No. 12/673,691 owned by assignee, the disclosures of which are hereby incorporated by reference. Access permissions and/or actual access are together designated as access metrics and may be used to designate subsets of all of the data elements in the enterprise.

Preferably, the system also continuously crawls over at least a subset of all data elements in the enterprise and maintains a database of metadata associated with each of the subset of data elements.

As shown in FIG. 6, the system preferably continuously maintains a database of access metrics which include actual access and access permissions of every user to every data element in the enterprise (600). Preferably, the system utilizes the database of access metrics to ascertain an owner for each of the data elements (602), and requires the owner of each of the data elements to apply at least one metatag to each of the data elements of which he is the owner (604).

Figure 7:
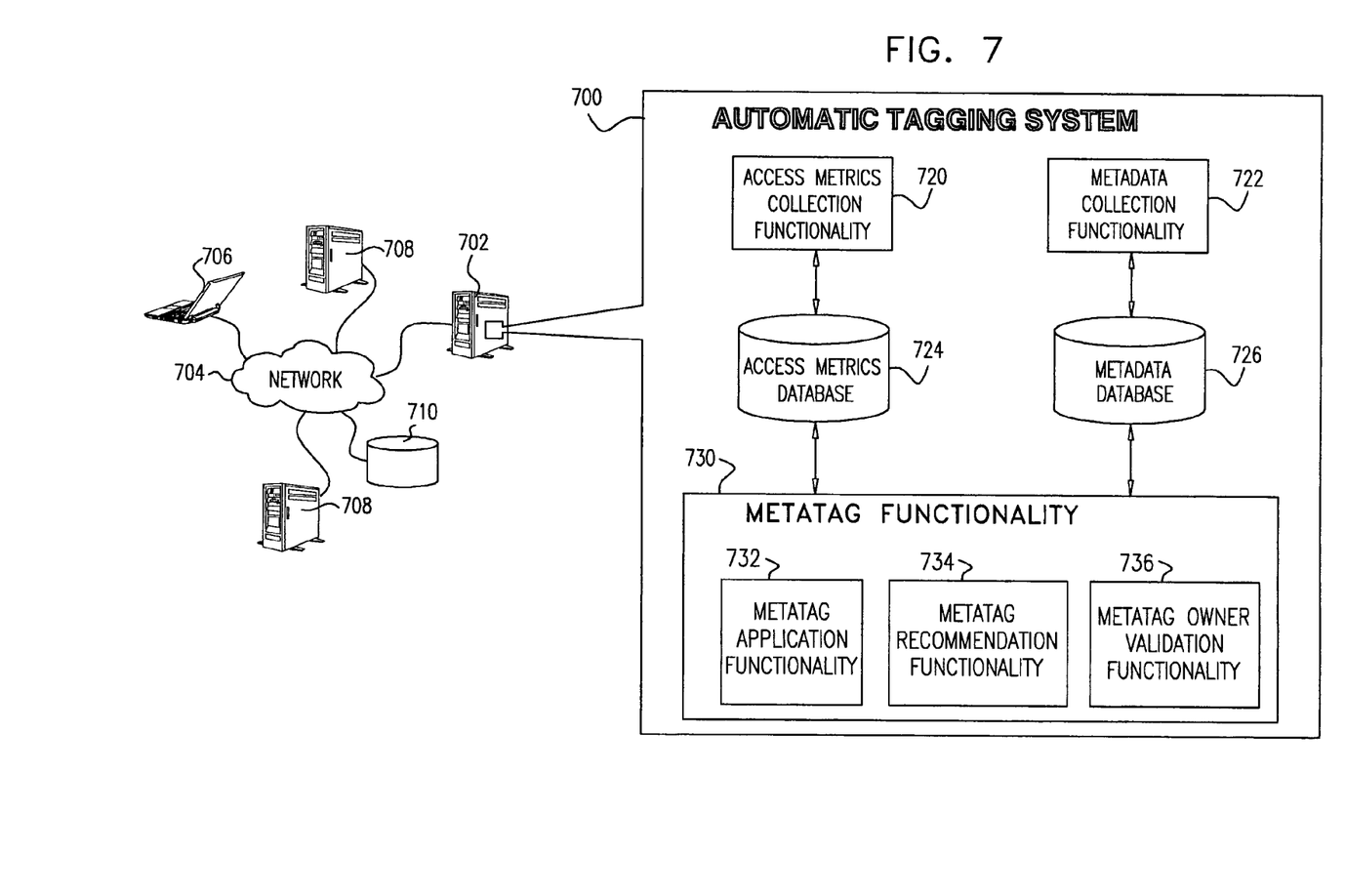
FIG. 7 is a simplified block diagram illustration of the automatic data tagging system whose functionality is illustrated in FIGS. 1-6.

Reference is now made to FIG. 7, which is a simplified block diagram illustration of the automatic data tagging system whose functionality is illustrated in FIGS. 1-6. The automatic data tagging system 700 typically resides on an a server 702 that is connected to an enterprise computer network 704 which preferably includes multiple disparate clients 706, servers 708 and data storage resources 710. Typically, data elements, such as computer files, reside on servers 708 and on data storage resources 710 and are accessible to users of the network in accordance with access permissions defined by an owner of each data element or each data element folder. It is appreciated that the data elements may reside on any suitable data storage system or platform, such as a file system or a data collaboration system, which may reside on any suitable computer operating system or infrastructure.

As shown in FIG. 7, the automatic data tagging system 700 comprises access metrics collection functionality 720 and metadata collection functionality 722. As described hereinabove regarding FIGS. 1-6, access metrics collection functionality 720 preferably stores access metrics in an access metrics database 724 and metadata collection functionality 722 preferably stores data element metadata in metadata database 726.

Metatag functionality 730 is preferably provided to utilize databases 724 and 726 to automatically apply metatags to data elements residing anywhere on network 704, as described hereinabove with regard to FIGS. 1-6. Metatag functionality 730 preferably includes metatag application functionality 732, which is operative to apply metatags to data elements, and metatag recommendation functionality 734, which is operative to recommend application of metatags to data elements. Metatag application functionality 730 also preferably includes metatag owner validation functionality 736, which is operative to ascertain owners of data elements and to require the owners of the data elements to assign metatags to data elements or to validate recommendations of metatag assignment recommended by metatag recommendation functionality 734.

It will be appreciated by persons skilled in the art that the present invention is not limited by what has been particularly shown and described hereinabove. Rather, the invention also includes various combinations and subcombinations of the features described hereinabove as well as modifications and variations thereof, which would occur to persons skilled in the art upon reading the foregoing and which are not in the prior art.

The invention claimed is:

1. A method for characterizing data elements, each of said data elements being accessible to users of an enterprise computer network in accordance with access permissions explicitly assigned by an assigned owner thereof, said method comprising:
continuously maintaining a database of at least one of said access permissions explicitly assigned by said assigned owner and actual usage of said data elements;
continuously maintaining a database of data identifiers associated with said plurality of data elements;
presenting to said assigned owner a visually sensible indication of authorization status, and to require said assigned owner to confirm or modify said authorization status;
specifying, by an administrator, at least one access permission explicitly assigned by said assigned owner and at least one data identifier;
ascertaining which of said plurality of said data elements have said at least one access permission explicitly assigned by said assigned owner, said at least one data identifier associated therewith and have had an authorization status thereof modified by said assigned owner;
specifying, by an administrator, administrator defined metatags to be associated with each of said data elements ascertained to have said at least one access permission explicitly assigned by said assigned owner, said at least one data identifier associated therewith and have had an authorization status thereof modified by said assigned owner;
automatically applying a metatag from among said administrator defined metatags to ones of said plurality of data elements ascertained to have said at least one access permission explicitly assigned by said assigned owner, said at least one specific data identifier associated therewith and have had an authorization status thereof modified by said assigned owner;
ascertaining an assigned owner for each one of said plurality of data elements ascertained to have said at least one access permission explicitly assigned by said assigned owner, said at least one data identifier associated therewith and have had an authorization status thereof modified by said at least one owner, said assigned owner having authority and accountability with respect to said one data element within said enterprise; and
requiring said assigned owner to review and validate said metatags automatically applied to said ones of said plurality of data elements owned thereby.

2. The method for characterizing data elements in an enterprise according to claim 1 and wherein said automatically applying a metatag comprises automatically applying specific ones of a plurality of different metatags to specific ones of said plurality of data elements.

3. The method for characterizing data elements in an enterprise according to claim 1 and wherein said automatically applying a metatag comprises automatically applying to each one of said plurality of data elements a metatag previously applied to a parent folder thereof.

4. The method for characterizing data elements in an enterprise according to claim 1 and wherein said data identifier is one of file type, author, category and language.

5. The method for characterizing data elements in an enterprise according to claim 1 and wherein said automatically applying a metatag comprises automatically applying a metatag to ones of said plurality of data elements.

6. A system having a computer comprising a processor, a memory and a non-transitory, tangible computer-readable medium in which computer program instructions are stored, which instructions, when executed by said processor, cause the computer to characterize data elements, each of said data elements being accessible to users of an enterprise computer network in accordance with access permissions explicitly assigned by an assigned owner thereof, said system comprising:
access metrics collection functionality operative to collect at least one of said access permissions explicitly assigned by said assigned owner thereof and actual usage of said data elements;
metadata collection functionality operative to collect data identifiers associated with said plurality of data elements;
entitlement review by owner functionality operative to present to said assigned owner a visually sensible indication of authorization status, and to require said assigned owner to confirm or modify said authorization status;
metatag specification functionality operative to facilitate specifying, by an administrator, administrator defined metatags to be associated with each of said data elements having at least one access metric permission explicitly assigned by said assigned owner, at least one data identifier associated therewith and have had an authorization status thereof modified by said assigned owner;
metatag application functionality operative to utilize said access metrics collection functionality, said metadata collection functionality and said entitlement review by owner functionality to ascertain which of said plurality of said data elements have said at least one access permission explicitly assigned by said assigned owner, said at least one specific data identifier associated therewith and have had an authorization status thereof modified by said assigned owner, and to automatically apply a metatag from among said administrator defined metatags to ones of said plurality of data elements ascertained to have said at least one access permission explicitly assigned by said assigned owner, said at least one data identifier associated therewith and have had an authorization status thereof modified by said assigned owner; and
metatag owner validation functionality operative to ascertain an assigned owner of each one of said plurality of data elements ascertained to have said at least one access permission explicitly assigned by said assigned owner, said at least one data identifier associated therewith and have had an authorization status thereof modified by said assigned owner, said assigned owner having authority and accountability with respect to said one data element within said enterprise, and to require each of said assigned owners to review and validate said metatags automatically applied to said ones of said plurality of data elements owned thereby.

7. The system according to claim 6 and wherein said metatag application functionality is also operative to automatically apply specific ones of a plurality of different metatags to specific ones of said plurality of data elements.

8. The system according to claim 6 and wherein said metatag application functionality is also operative to automatically apply to each one of said plurality of data elements a metatag previously applied to a parent folder thereof.

9. The system according to claim 6 and wherein said data identifier is one of file type, author, category and language.

10. The system according to claim 6 and also comprising a metadata database which stores said metadata collected by said metadata collection functionality.

11. The system according to claim 6 and wherein said metatag application functionality is also operative to utilize said access metrics collection functionality and said metadata collection functionality to automatically employ said access metric and said data identifier to automatically apply a metatag to ones of said plurality of data elements.

12. The system according to claim 6 and wherein said metatag application functionality is also operative to utilize said access metrics collection functionality to automatically employ said access metric to automatically apply a metatag to ones of said plurality of data elements.

13. The system according to claim 6 and wherein said metatag application functionality is also operative to utilize said metadata collection functionality to automatically employ said data identifier to automatically apply a metatag to ones of said plurality of data elements.

* * * * *